United States Patent [19]

Fukuoka

[11] 4,286,745
[45] Sep. 1, 1981

[54] CONTAINER FOR BEVERAGES AND THE LIKE

[75] Inventor: Kazuaki Fukuoka, Yokohama, Japan

[73] Assignee: Norton Simon, Inc., New York, N.Y.

[21] Appl. No.: 111,464

[22] Filed: May 23, 1979

[51] Int. Cl.³ .................. B65D 3/14; B65D 3/22; B65D 3/28
[52] U.S. Cl. .................. 229/4.5; 206/634; 220/66
[58] Field of Search .................. 229/4.5, 3.5 MF; 220/66; 206/639

[56] References Cited

U.S. PATENT DOCUMENTS

| | | | |
|---|---|---|---|
| 1,963,795 | 6/1934 | Lang | 220/66 |
| 1,987,817 | 1/1935 | Burns | 220/66 |
| 2,012,213 | 8/1935 | Young | 220/231 X |
| 2,027,430 | 1/1936 | Hansen | 220/66 |
| 2,115,340 | 4/1938 | McCrossen | 220/44 |
| 2,623,681 | 12/1952 | Wilcox | 229/4.5 |
| 2,982,457 | 5/1961 | D'Alelio | 229/3.5 MF |
| 3,089,630 | 5/1963 | Garuin | 229/4.5 |
| 3,105,765 | 10/1963 | Creegan | 99/152 |
| 3,157,336 | 11/1964 | Elam | 229/4.5 |
| 3,160,302 | 12/1964 | Chaplin | 215/38 |
| 3,162,347 | 12/1964 | Taylor | 229/4.5 |
| 3,247,869 | 4/1966 | Boegershauser et al. | 229/4.5 X |
| 3,274,905 | 9/1966 | Demsey, Jr. et al. | 229/4.5 X |
| 3,279,675 | 10/1966 | Elam et al. | 229/4.5 |
| 3,317,108 | 5/1967 | Cheeley | 229/4.5 |
| 3,400,853 | 9/1968 | Jacobsen | 220/66 |
| 3,457,130 | 7/1969 | Morrison | 156/190 |
| 3,613,956 | 10/1971 | McCulloch | 229/52 A X |
| 3,687,351 | 8/1972 | Kaercher | 229/4.5 |
| 3,712,534 | 1/1973 | Fienup et al. | 206/634 |
| 3,716,435 | 2/1973 | Jensen | 229/4.5 X |
| 3,882,763 | 5/1975 | Ellerbrock et al. | 93/55.1 M |
| 3,933,298 | 1/1976 | Ellerbrock | 229/5.6 |
| 3,961,566 | 6/1976 | Westphal et al. | 229/43 R X |
| 3,981,433 | 9/1976 | Thornhill et al. | 206/634 |
| 4,091,718 | 5/1978 | Thornhill | 93/39.1 R |
| 4,098,404 | 7/1978 | Markert | 220/66 X |
| 4,114,784 | 9/1978 | Hough et al. | 220/408 |

Primary Examiner—Davis T. Moorhead
Attorney, Agent, or Firm—Pennie & Edmonds

[57] ABSTRACT

A container for flowable materials including liquids such as fruit juices and other beverages comprises a tubular body member composed of five plies bonded to each other, the first, third and fifth plies being each formed of an elongated helically wound polyolefin whose edges are overlapped and bonded with those of adjacent convolutions to form a cylindrical layer. The second and fourth plies are formed of a helically wound elongated cup paper sheet material which is thicker than the polyolefin sheet material and whose edges are in abutment with those of adjacent convolutions to form a cylindrical layer. In another container, the tubular body member is composed of a first (innermost) ply of polyolefin sheet material having overlapped convolutions, a second ply of aluminum sheet both sides of which are laminated by thin paper, a third ply of kraft paper liner having butted convolutions, and a fourth ply of polyolefin sheet material having overlapped convolutions. In yet another container, the tubular body member is composed of at least two layers, the innermost layer being formed from a sheet of synthetic resin having overlapped convolutions and provided with a continuous bond or weld along the overlapped portion and a second bond adjacent to the first so as to form and define a slack portion of the overlap adapted to be taken up inwardly in response to negative pressure in the container. The tubular body member of the container is hermetically sealed with end-closures at least one of which can be formed of rigid sheet material of sufficient flexibility and provided with an initially outwardly bulged dish-shaped portion whereby the dish-shaped portion can be inwardly deflected to relieve negative internal pressure, such as results from thermal contraction of the contents of the container.

7 Claims, 19 Drawing Figures

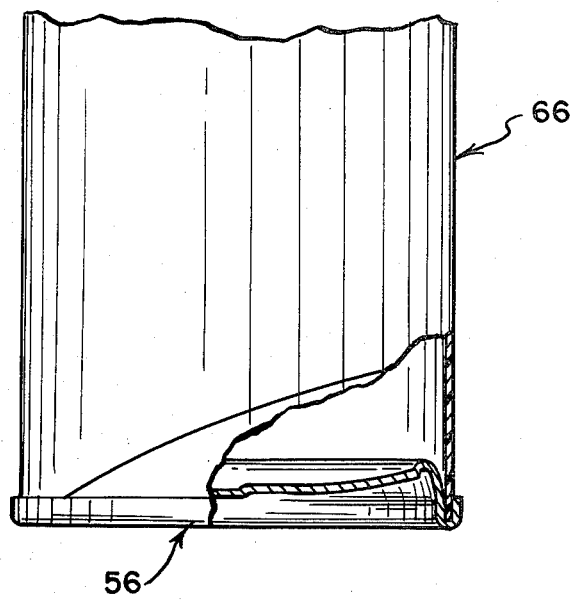
FIG. 12A
FIG. 12B
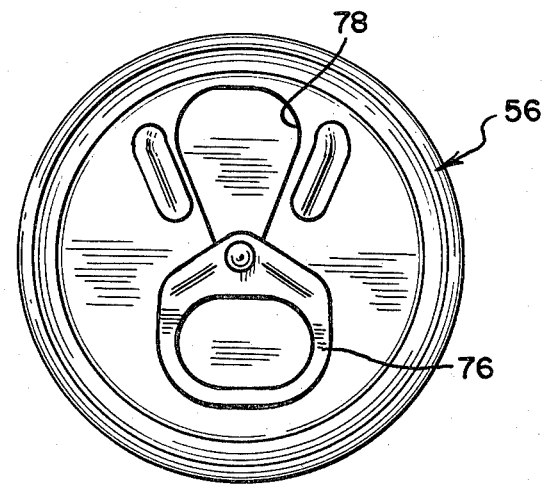

CONTAINER FOR BEVERAGES AND THE LIKE

TECHNICAL FIELD

This invention relates to containers for flowable materials including liquids such as fruit juices and the like, and to a method of canning such materials in sealable containers wherein the materials are heat treated and packaged. More particularly, it relates to tubular wall members for forming tubular containers in which flowable materials, e.g., a beverage such as fruit juice, are sealed and packaged for long-term storage. In addition, the invention has to do with a cap or closure member for hermetically sealing the aforesaid containers, and which is capable of alleviating internal negative pressure.

BACKGROUND ART

Heretofore, containers or "cans" for packaging flowable or pourable materials including liquids, particularly beverages such as fruit juice and other food-stuffs, have been generally formed of glass, tinplate, aluminum and the like. Although these materials are satisfactory from the standpoint of airtighness and strength, difficulty is often encountered in disposing of these materials after use, in a manner consistent with environmental considerations, and a long-felt need has therefore existed for a container which can be so readily disposed of. From the standpoint of economy of resources, it is also desirable that containers be made of inexpensive substitutes for increasingly expensive conventional materials.

In addition, the laws in many jurisdictions require that, in the processing of certain foodstuffs such as fruit or fruit juice, the product be heated or pasteurized at or above a certain temperature before being put in containers and sealed. However, some foodstuffs, for example, beverages, when processed in this manner will often contract upon cooling in the container, thereby creating negative pressure, i.e., a pressure below atmospheric. If such containers are formed of materials having little rigidity such as thin aluminum, synthetic resins or plastics, the negative pressure must be relieved without breaking the seal in order to avoid the buildup of unwanted stress on the container and consequent strain leading to unsightly deformation of the container wall, structural damage or even failure of the unit. Alternatively, if the container is made of laminated paper, kraft paper, cup paper or other like sheet material, it may not only be deformed but also, due to the pressure differential between the interior and the exterior of the container, may rupture at the seal between the lid and side wall, thereby exposing the contents to infection by infiltration from without, e.g., by bacteria, mal-odorants and the like, with resulting curtailment of shelf storage life. For this reason, it has been customary to use materials of such lower rigidity only for containers intended, e.g., for non-pasteurized or carbonated beverages and the like which provide a neutral or positive pressure within the container.

In the past, tinplate has been the material of choice in making blanks for "tin cans" designed to withstand the aforementioned negative pressure due to its greater rigidity, and for airtightness. However, tinplate is relatively expensive compared to cup paper and the newer synthetic resins and the like and also requires greater effort in its disposal after use. Furthermore, even in the case of tinplate, some deformation of the can or container as a result of negative pressure cannot be avoided.

In the past, ways of coping with this problem have included the means shown in FIG. 1 of the drawings. In particular, end-closure 2 of can body 1 is not flattened but rather, is provided with, say, two concentric convex circular ribs 3 and 4 to provide flexibility and permit the closure to deform in response to the internal negative pressure and decrease the latter, thereby preventing container wall 5 from being dented. The small degree of deformation permitted in closure cover 2 limits reduction in the negative pressure but is enough in the case of containers made of conventional tinplate. However, in the case of containers or cans made of thin aluminum, plastics, cellulose-based sheet material and the like, this approach has not proven satisfactory and does not contribute to a solution of the problem. Therefore, containers designed for packaging materials which normally tend to develop substantial internal negative pressures have not heretofore been made successfully of these materials. Other previous attempts at solving the foregoing problems, as exemplified in U.S. Pat. Nos. 1,963,795; 1,987,817; 2,012,213; 2,027,430; 2,115,340; 2,623,681; 2,982,457; 3,089,630; 3,105,765; 3,160,302; 3,247,869; 3,400,853; 3,457,130; 3,687,351; and 3,716,435, have likewise not proven adequate for their solution.

Accordingly, it is an object of the present invention to provide a tubular member or element which defines the wall of a fully airtight and easily disposable container for sealingly packaging flowable materials including beverages and other foodstuffs for long-term storage.

Another object is to provide an improved tubular container wall member or element which effectively protects the contents of the container from impregnation by offensive odors and infectious organisms from without, and which is made of relatively inexpensive and easily disposable materials.

Another object is to provide an improved tubular container and a process for hermetically sealing therein a flowable material such as a beverage or other foodstuff, e.g., fruit juice, which are adapted to respond to and relieve internal negative or sub-atmospheric pressure without breaking the seal.

Another object is to provide a container cover or closure member adapted to respond to and relieve internal negative pressure created, for example, by thermal contraction of the contents of the container, without breaking the seal.

Another object is to provide a container cover or closure member designed so that internal negative pressure created, for example, by thermal contraction within the container, causes the closure cover to become depressed inwardly to an extent not exceeding the degree of thermal contraction, thereby substantially relieving such negative pressure.

Yet another object is to provide fully airtight and easily disposable liquid containers made of materials such as thin aluminum, plastic or synthetic resins, laminated paper, kraft paper, cup paper and the like, which containers are defined by a tubular wall member and by two cover or end-closure members at least one of which end-closure members is adapted to relieve negative pressure generated within the container.

These and other objects of the invention as well as a fuller understanding of the advantages thereof can be had by reference to the following description, drawings and claims.

SUMMARY OF THE INVENTION

The foregoing objects are achieved according to the present invention by the discovery of a novel container for flowable materials including liquids such as fruit juices and other non-carbonated beverages. Broadly, the container comprises a tubular side-wall member hermetically sealed at both ends, preferably with at least one deformable end-closure described in greater detail hereinbelow. The tubular side-wall member is preferably cylindrical, i.e., having a circular cross-section. Alternatively, the tubular wall member can have a polygonal or elliptical cross-section.

According to one aspect of the invention, the tubular wall member of the tubular container comprises a tubular element composed of five plies bonded together, preferably with an adhesive. For descriptive purposes the plies can be visualized as being numbered from 1 to 5, starting from the inner surface of the tubular element. The first, third and fifth plies are each formed of an elongated helically wound polymeric resin sheet material, preferably polyolefin, e.g., polypropylene. The upper and lower edges of the convolutions of each of the first, third and fifth plies are overlapped with those of the adjacent convolutions and the overlapped portions are bonded to each other, preferably with an adhesive, to form a tubular layer or ply. The second and fourth plies are formed of a helically wound elongated cellulosic sheet material, preferably cup paper, having abutted convolutions and which is desirably thicker than the polymeric sheet material of the first, third and fifth plies. In particular, the first, third and fifth plies each desirably has a thickness of between about 0.08 and about 0.12 mm, and preferably about 0.1 mm; and the second and fourth plies each desirably has a thickness of between about 0.20 and about 0.30 mm, and preferably about 0.25 mm. Very good results are obtained with a container whose side-wall member has a total thickness of about 0.8 mm.

In another aspect of the invention, a tubular container wall member is provided having a novel configuration which permits the use of inexpensive kraft paper liner sheet material as a substantial constituent of the tubular element in applications where such material would otherwise be ineffective for preventing the odor of the container's contents from permeating the container wall and escaping or for preventing an offensive odor from infiltrating the container contents from without. In such circumstances, it would have been impossible prior to the present invention to use an inexpensive kraft liner paper which, although providing sufficient mechanical strength, would tend to emit or impart to the container contents an offensive odor. For this reason, the use of cup paper sheet material has heretofore been mandatory. In the present invention, the tubular wall member has a bonded multilayer tubular element comprising, starting from the inner wall surface, a first ply of polymeric sheet material, preferably polyolefin; a second ply of aluminum sheet material both sides of which are laminated by thin paper; a third ply of kraft liner sheet material; and a fourth ply of polymeric sheet material, preferably polyolefin. The third ply of kraft liner sheet is desirably formed of a plurality of layers of such material, preferably two layers. The various plies are preferably bonded to each other, preferably with adhesive.

The first, second and fourth plies of the tubular element are preferably each formed of a helically would elongated sheet material having overlapping convolutions, the overlapped portions of said convolutions being bonded to each other, preferably with adhesive, to form a tubular ply. Each layer of the second ply is formed of a helically wound elongated sheet material, which is preferably thicker that each of the first, third and fourth plies. Further, the edges of adjacent convolutions of each layer of the second ply are in abutment rather than overlapped, to form a tubular layer. The first and second plies each desirably has a thickness of between about 0.08 and 0.12 mm, and preferably about 0.1 mm; each of the kraft liner paper sheets or layers constituting the third ply has a thickness of between about 0.2 and about 0.4 mm, and preferably about 0.3 mm, and the fourth ply has a thickness of between about 0.05 and about 0.1 mm, and preferably about 0.07 mm.

The container of the invention can be hermetically sealed at one or both ends with a sealing or closure member according to the present invention after being charged with filler, e.g., a heated liquid. Such closure is formed of rigid sheet material of sufficient flexibility and is provided with an outwardly bulged dish-shaped portion before sealing, whereby said bulged portion is capable of undergoing inward deflection by the negative pressure created in the container due to thermal contraction of its contents. The dish-shaped portion of the closure is desirably bulged to such an outward extent that the volume by which the container is reduced by inward deflection of said portion does not exceed the degree of thermal contraction, but rather corresponds substantially to the thermal contraction of the contents of the container or can, thereby substantially relieving such negative pressure. Suitable materials for forming the end-closure include aluminum, plastic, cup paper and the like, with aluminum sheet material being especially preferred.

In reference to the above-described sealing or closure member, the bulged portion is formed in the end-closure so as to be inwardly deflected in preference to any deflection or deformation of the side wall by the negative pressure generated in the container. Such end-closure must therefore be designed to intially withstand the negative pressure to a lesser degree than the side wall of the container body. This requires the end-closure to be thinner than would normally be the case with more conventional non-deformable end-closures, and since the heat of the heated container contents tends to lessen the strength of the container body, the end-closure must also be thin enough to compensate for such reduction in strength. On the other hand, a hermetic seal between the end-closure and the container body is usually achieved by folding their peripheries in a manner which is apparent to those skilled in the container art. Accordingly, with the thinner end-closure of the present invention it may be somewhat difficult to obtain proper hermetic sealing of the container. For instance, when the container wall is of a composite structure made according to the present invention of materials such as cup paper, laminated cup paper sheet and the like and synthetic resin paper, it is difficult to form a lap seam relying on plastic deformation of such elements, since these materials, in contrast to metal, have neither malleability nor plasticity. Consequently, the container body is sealed by the end-closure in such a way that the metal end-closure material is adapted to have its periphery folded to rigidly hold the periphery of the container body. However, if the end-closure is made thinner this not only weakens its clamping force and makes it difficult to obtain a satisfactory lap seam but also it requires specially designed sealing apparatus other than those which are conventional and desirable. For these reasons the end-closure cannot be thinned beyond a certain limit and in such cases it is difficult to make an end-closure capable of being optimally inwardly depressed in response to the negative pressure created in the container. In such cases, the container cannot relieve the negative pressure completely. Upon consideration of the foregoing, it follows that aluminum is preferred for use as the end-closure material; however, aluminum is more expensive than the tinplates conventionally used for container end-closures, thereby increasing overall cost.

These potential problems are avoided in a further aspect of the invention which provides a process or method of canning goods in a sealable container and an end-closure used for such purpose whereby the negative pressure created in the container can be sufficiently relieved and a bonding of the container body and the end-closure is fully ensured. In particular, the initially outwardly bulged portion of the top end-closure is inwardly depressed by a press or the like as opposed to the previously described aspect of the invention wherein the bulged portion is depressed by the negative pressure created in the container. This avoids the necessity of making the end-closure thinner and facilitates the formation of a hermetical lap seam between the open end of the container and the flange of the end-closure. Further, the sealing apparatus can be of conventional design thereby reducing production cost, while the substantial inward depression of the end-closure affords the desired avoidance of any buildup in negative pressure. Furthermore, the end-closure of this embodiment of the invention is not limited to the use of aluminum and the like, but rather, can be formed of conventional tinplate blanks thereby substantially reducing the cost (to about half as much as aluminum) of manufacturing the end-closure.

Although this embodiment has been described with reference to a container whose top end-closure is provided with the bulged portion, it is not limited to this particular construction. For example, the bulged portion can be formed in the bottom end-closure and/or the top-end closure.

In the case where only one end of the container is fitted with the above-described sealing closure, the other end can be fitted with any other suitable conventional closure such as an easy-open top of the pilfer or pull-up tab type which are well-known in the beverage art. Such end-closure can be made of any convenient material, e.g., aluminum, and is joined to the container body before the latter is charged with filler.

In containers of the invention described hereinabove where the volume of the contents is on the order of 250 ml or less, the surface area of the pressure responsive end-closure is sufficiently large relative to the total surface area of the container that good results are insured. However, in the case of containers having volumes as large as 500 ml, 1000 ml, or more, the use of a single pressure responsive end-closure or even two such end-closures may be insufficient to compensate for or alleviate negative internal pressure to the degree desired. This problem is solved according to another aspect of the invention in the form of a tubular element which is itself adapted to inhibit deformation of the sealed tubular container of large as well as small volume in which a negative pressure is developed and which provides good airtightness. In accordance with this aspect of the present invention, the innermost ply or layer of the tubular element of the tubular wall member is provided with means adapted to be inflated inwardly in response to negative pressure developed in the container, thereby decreasing the negative pressure so as to protect the container wall from deformation, improve airtightness, and preserve the shelf-life of the contents.

In particular, the tubular wall member of this aspect of the invention has a bonded multilayer tubular element comprising a plurality of plies, the innermost ply being formed of a helically wound elongated polymer-containing sheet material, preferably a polyolefin, having overlapping convolutions, the overlapped portions being bonded, preferably with adhesive. The overlapped portion of the convolutions of this innermost ply is provided with a continuous bond along the seam and at least one additional and preferably continuous bond adjacent to and substantially parallel with the first bond and defining together with the first bond a slack portion therebetween along the overlapped portion of the convolutions of the innermost ply. The slack portion functions by virtue its capacity to be taken up or inflated inwardly in response to negative pressure in the container. Preferably, the tubular element comprises three plies bonded together with adhesive, the middle ply, i.e., the second ply from the innermost ply, being formed of a helically wound elongated cellulosic sheet material, preferably one or more layers of kraft liner paper, which is thicker than either the first or third ply. The edges of the adjacent convolutions of the middle ply are in abutment to form a tubular layer. The third or outermost ply is preferably formed of a helically wound elongated cellulosic sheet material, preferably kraft liner paper, having overlapping convolutions, the overlapped portions of which are bonded to each other, preferably by means of adhesive, to form a tubular layer or ply. The first ply has a thickness of desirably between about 0.08 and about 0.12 mm, and preferably about 0.1 mm. The second ply has a thickness of desirably between about 0.2 and about 0.4 mm, and preferably about 0.3 mm.

BRIEF DESCRIPTION OF THE DRAWINGS

The present invention will now be further described with reference to the accompanying drawings wherein:

FIG. 12A is an orthographic projection, partially in section, of one form of a bottom end-closure suitable for use with the cylindrical wall member and top end-closure of the present invention in forming the container of FIG. 8; and FIG. 12B is a bottom plan view of the end-closure depicted in FIG. 12A;

DESCRIPTION OF PREFERRED EMBODIMENTS

The following examples are provided for the purpose of illustrating, without limitation, the present invention and the advantages thereof.

EXAMPLE 1

Figure 2:
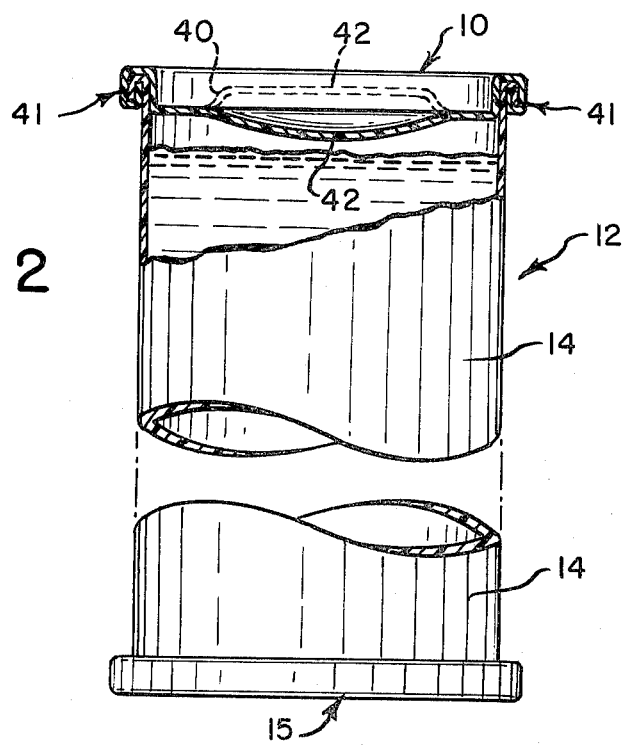
FIG. 2 is a side view in partial cross-section of a beverage container having an end-closure and cylindrical wall member or element according to one embodiment of the present invention.

Referring to FIG. 2, there is shown a container 12 according to the present invention for containing a liquid, e.g., a beverage such as fruit juice. Container 12 includes top end-closure or cover 10 joined to the upper edge or flange of cylindrical body member or element 14, and bottom end-closure or cover 15 joined to the bottom edge or flange of the cylindrical body member.

Figure 1:
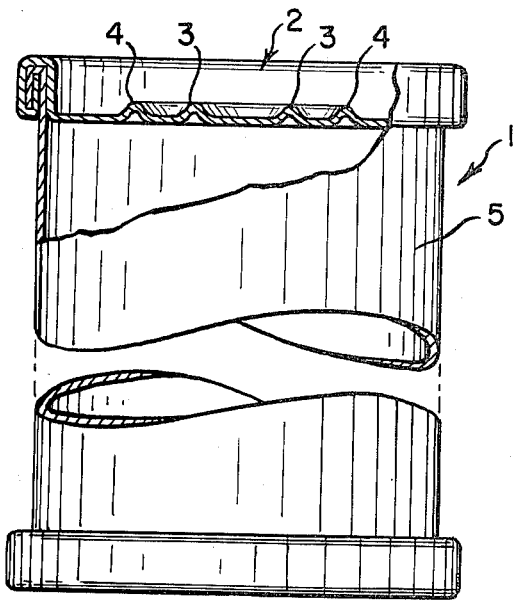
FIG. 1 is a side view of a conventional foodstuff container shown in partial cross-section to emphasize the details of its construction.
Figure 3:
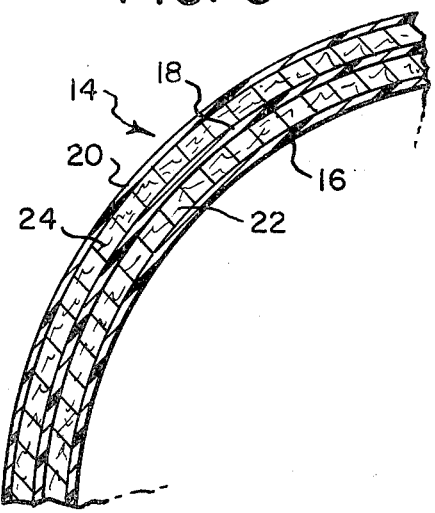
FIG. 3 is a partial transverse cross-sectional view of the cylindrical wall member of the container of FIG. 2.
Figure 4:
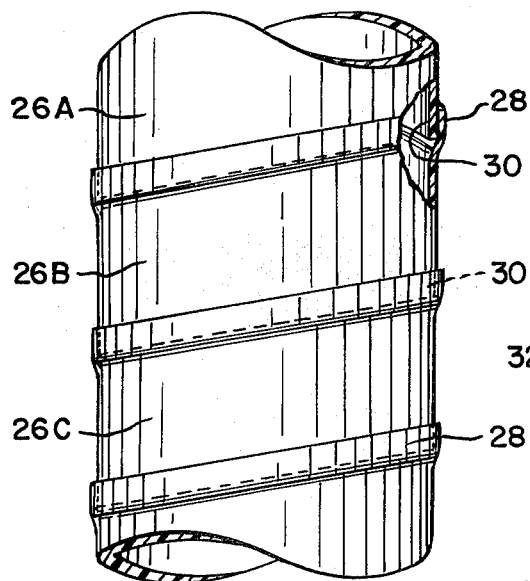
FIG. 4 is a representation of the structures of the first, third, and fifth plies forming the cylindrical wall member of the container of FIG. 2.
Figure 5:
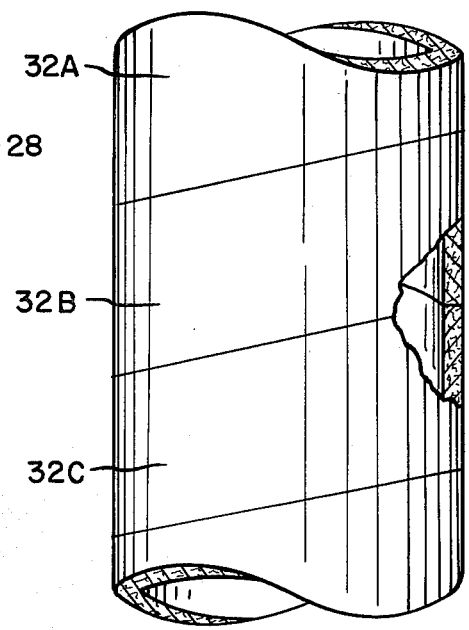
FIG. 5 is a representation of the structures of the second and fourth plies forming the cylindrical wall member of the container of FIG. 2.
Figure 6:
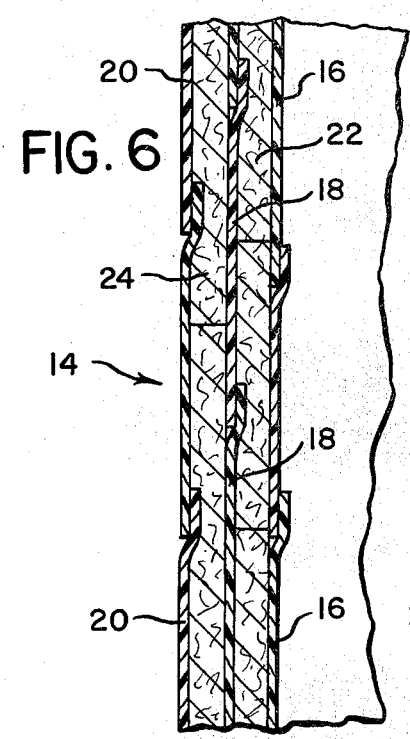
FIG. 6 is a fragmentary longitudinal cross-section of the cylindrical wall member of the container of FIG. 2.

The container body 14 can be formed of any suitable material such as aluminum, synthetic resin or plastic, and cup paper insofar as they provide the desired permeability and airtightness. In this embodiment, container body 14 comprises a laminated composite of five plies as shown in FIG. 3. The first, third, and fifth plies 16, 18, and 20 are each composed of elongated polymeric resin sheet material helically wound as shown in FIG. 4. The second and fourth plies 22 and 24 are each composed of elongated cup paper sheet material helically wound between the adjacent plies 16, 18 and 20 as shown in FIG. 5. The upper edge 28 and lower edge 30 of one convolution 26B of each of the polymeric plies respectively overlaps and is overlapped by adjacent convolutions 26A and 26C at their respective associated lower and upper edges, the overlapped portions being bonded or glued to each other by an adhesive therebetween to form a cylindrical layer. A preferred example of the polymeric resin sheet material is sold commercially by Toyo Tafuper Co., Ltd. under the trademark "Tafuper" a polyolefin containing much inorganic substance. An example of a suitable adhesive for the overlapping portions of convolutions 26A, 26B and 26C is sold commercially by Gisuke Konishi & Co., Ltd. under the trademark "KU-820". As shown in FIG. 5, the second and fourth plies 22 and 24 are helically wound; however, convolution 32B of each ply is butted at its upper and lower edges to adjacent convolutions 32A and 32C instead of being overlapped.

In the manufacture of container body 14, depicted in its various parts in FIGS. 2 through 6, the sheet for first ply 16 is initially wrapped about a cylindrical mandrel (not shown) of a desired diameter. Next, sheets for the second, third, fourth, and fifth plies 22, 18, 24 and 20 are successively wrapped around the mandrel, preferably in the same direction, to form an elongated cylindrical member. The convolutions of the wound sheets are overlapped or butted, as the case may be, and the sheets are joined to each other by a suitable adhesive, e.g., of the type sold by Koatsu Gas Kogyo Co., Ltd. under the trademark "Pegarl 210P". This cylindrical member is then cut to a desired length to obtain container body 14.

The first, third, and fifth plies 16, 18, and 20 impart the requisite airtightness to container body 14 while effectively containing any odor emanating from the cup paper used for the second and fourth plies 22 and 24. The second and fourth plies 22 and 24 impart adequate mechanical strength to cylindrical body element 14.

The sheets of polymeric resin and cup paper can be employed in various thicknesses consistent with the foregoing disclosure. In the present preferred embodiment, the sheet material used for the first, third and fifth plies 16, 18, and 20 is about 0.1 mm thick, and the sheet material used for the second and fourth plies 22 and 24 is about 0.25 mm thick. The average total thickness of all the plies of container body 14 is about 0.8 mm. A double seam 41 is formed as shown in FIG. 2 in order to provide airtightness between container body 14 and top end-closure 10 and likewise between the container body and bottom end-closure 15. It has been found, however, that such double seams become increasingly difficult to form if the container body 14 is substantially thicker than about 0.8 mm. On the other hand, if the container body is substantially thinner than about 0.8 mm, it tends to have less than desired strength. The bottom end-closure 15 is conventional and can take the form of an easy-open end such as a pilfer or pull-up tab well-known in the beverage packaging art. The bottom end-closure 15 in this instance is made of aluminum and is joined to container body 14 before the container 12 is filled. Incidentally, it should be noted that the terms "top-end closure" and "bottom end-closure" are used herein with reference to the drawings; in the context of actual use of the container in the upright position, the "bottom end-closure" would normally become the top and vice versa.

Figure 7:
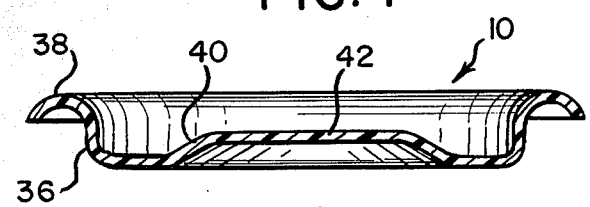
FIG. 7 is a longitudinal cross-sectional view of the top-end closure prior to being joined to the cylindrical wall member of the container of FIG. 2.

The top-end closure 10 is formed with the configuration shown in FIG. 7, and has an initially convex or dish-shaped bulge portion 42, an inclined side 40, an annular shoulder 36 adapted to be fitted into the interior of container body 14, and a flange 38 which is adapted to be double-seamed by conventional means (not shown) to the upper flange of the container body. Top end-closure 10 is hermetically joined to the upper edge of the container body immediately after the filler, e.g., fruit juice which has been heated to a predetermined temperature (normally at least about 90° C.), has been charged to the container body and bottom-end closure assembly. After being fully sealed, the beverage-filled container is allowed to stand at ambient temperature or is placed in a refrigerator. In such circumstances the pressure of the fluid within the container decreases, thereby producing a negative pressure. As a result, the dish-shaped bulge 42 is inwardly deflected or "popped" to form a concavity or "dent" in top-end closure 10 as shown in FIG. 2. The extent to which the volume of container 12 is thereby reduced is defined by the disc-shaped bulge 42 shown by the dotted line and the concavity shown by the solid line in FIG. 2, and is enough to compensate for the thermal contraction of the filler, thereby substantially relieving the negative pressure in the container. It is, of course, desirable to that top end-closure 10 be formed in such a manner that the degree to which the volume of the can is reduced by inward deflection of bulge 42 corresponds to the degree of thermal contraction of the contents in the can so that the negative pressure is essentially reduced to zero, i.e., neutralized. However, if desired, top-end closure 10 can be dimensioned so that some negative pressure is left in container 12 after the dent is formed in bulge 42 so long as it does not affect the strength or airtightness of the container. Very good results are obtained by forming the above-described end-closure from H-24 0.20 MT aluminum sheet material sold by Kito Sangyo and Shibazeki Susakasgo Co. under the name "Flexiend".

EXAMPLE 2

Figure 8:
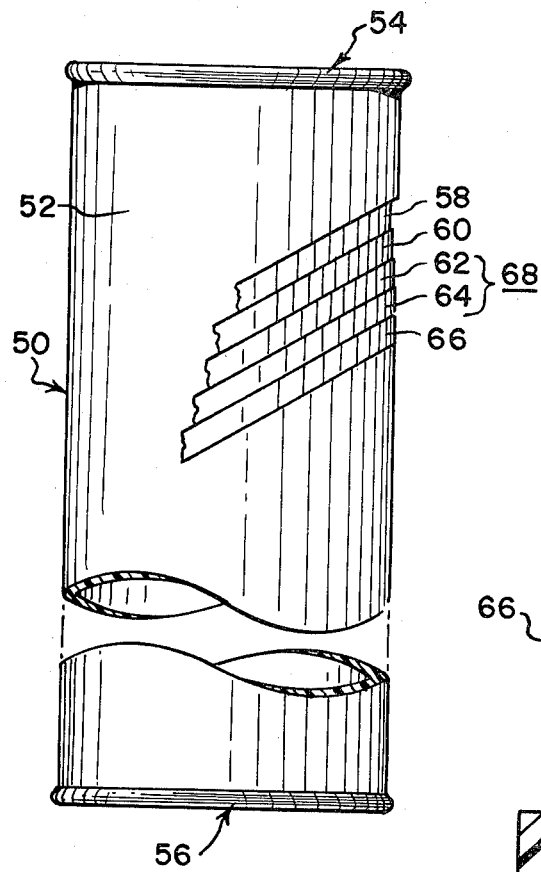
FIG. 8 is a side view partially broken away of a sealed cylindrical container according to a second embodiment of the invention.

Referring to FIG. 8, a sealed fruit juice container 50 is formed by applying top-end closure 54 and bottom end-closure 56 to the upper and lower edges of cylindrical container body 52.

Figure 9:
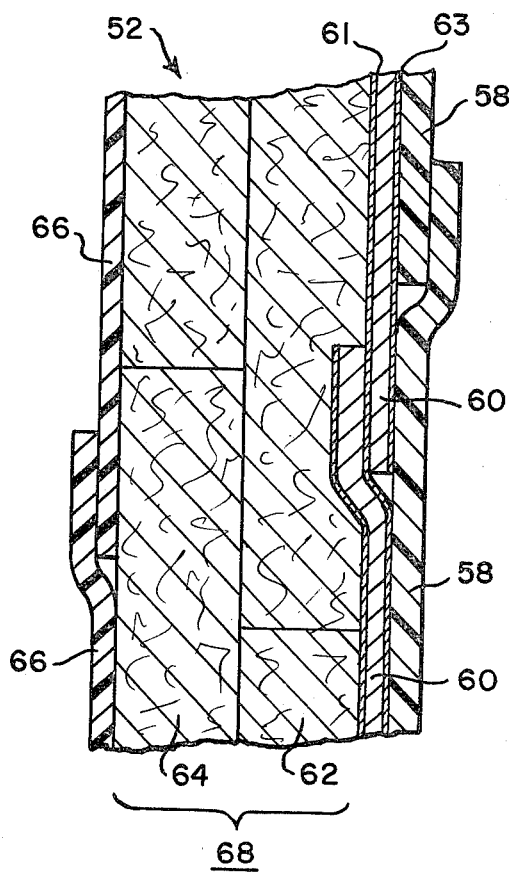
FIG. 9 is a longitudinal cross-sectional view of a portion of the cylindrical wall member of the container of FIG. 8.

As is apparent from the longitudinal cross-section depicted in FIG. 9, cylindrical member 52 is composed of a plurality of plies. Specifically, cylindrical member 52 comprises, starting from the inside (right-hand of FIG. 9), layer 58 (first ply) of polyolefin resin sheet material; aluminum sheet layer 60 (second ply) both sides of which are laminated with thin paper sheets 61 and 63; kraft liner paper sheet layer 68 (third ply) having respectively inner and outer layers 62 and 64 of kraft liner paper, and a further layer 66 (fourth ply) of polyolefin resin sheet material. Although the container body is preferably formed using aluminum as the second ply 60, the present invention can also be applied to tinplate, particularly thinner tinplates than those conventionally used, thereby effecting substantial cost savings.

Figure 10:
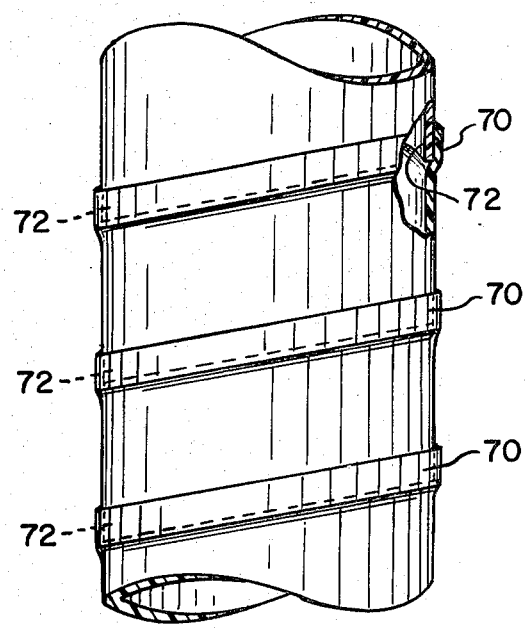
FIG. 10 is a representation of the formation of the first, second and fourth plies forming the cylindrical wall member of the container of FIG. 8.

The first, second and fourth plies 58, 60, and 66 shown in FIG. 9 are helically wound as shown in FIGS. 8 and 10. The upper edge 70 of one convolution overlaps the lower edge 72 of the adjacent convolution and the thus-overlapped portions of the convolutions are bonded together to form a cylindrical ply. The inner layer 62 and the outer layer 64 of the third ply 68 are, as apparent from FIG. 9, respectively made by spirally winding an elongated sheet of kraft liner paper without overlapping, but rather, by abutting the edges of the convolutions. The first, second, third and fourth plies 58, 60, 68 and 66 and the inner and outer layers 62 and 64 of the third ply are bonded to each other, preferably by adhesive.

In practice, container body 52 is formed by wrapping or winding the sheet for the first ply about a mandrel (not shown) of a desired diameter. Next the sheets for the second, third (inner and outer layers), and fourth plies are successively wrapped or wound about the mandrel to form an elongated cylindrical member. The convolutions of the sheets are overlapped or abutted, as the case may be, and the sheets are joined to each other by application of an adhesive between successive windings. The thus-formed cylindrical member is then cut to a desired length to obtain container body 52.

The first ply 58 of polyolefin resin serves to fully prevent the fruit juice from permeating the wall of the container, although an acceptable loss through absorption by the first ply of some product aroma may be inevitable. The second ply 60 of aluminum laminated by thin paper sheets 61 and 63, serves to fully prevent the aroma of the fruit juice from escaping further. The kraft liner paper of the third ply 68 (both inner and outer layers 62 and 64 are not mandatory; either a single layer or a multiplicity of layers can be used) provides sufficient strength to resist internal-external pressure differences and corresponding tensile or compressive forces in the axial direction. In this connection, it has been found that, although kraft liner paper has more strength than the cup paper used in the embodiment of Example 1 and FIGS. 1-7, it is somewhat less desirable due to its odor. According to the present embodiment, aluminum sheet layer 60 is employed as the second ply to inhibit any offensive odor of kraft liner paper from infiltrating the contents of the container so that such paper can be advantageously used as the third ply. Finally, polyolefin resin sheet layer 66 is applied as the fourth ply outwardly of the kraft liner paper 68 to fully prevent moisture entering from without.

The materials listed below are especially suitable for use as the first, second, third, and fourth plies for container body 52 of container 50 of FIGS. 8 through 10. The container 50 typically has an outer diameter of 56 mm, a height of 137 mm, and a side-wall thickness of 0.87 mm, an arrangement which has been found to be particularly satisfactory for packaging fruit juices.

First ply: "Tafuper", —FR 0.1 mm—, manufactured by Toyo Tafuper Co., Ltd.;
Second ply: "Thin paper laminate aluminum sheet", —35 g, 0.1 mm—, manufactured by Mitsubishi-Aluminum Co., Ltd.;
Third ply: "Kraft liner paper" ("K-Liner") —A 220 g, 0.3 mm—manufactured by Tohoku Paper Mills Co., Ltd. (both layers); and
Fourth ply: "Tafuper", —OMT 0.07 mm—, manufactured by Toyo Tafuper Co., Ltd.

Incidentally, the material "Tafuper (OMT)" used as the fourth ply is characterized in that it accepts conventional printing materials directly on its surface and therefore can be conveniently used as the outermost layer.

The following adhesives are especially suitable for bonding adjacent plies to one another and for bonding the overlapping portions of the convolutions of the first, second and fourth plies:

"Tafuper" to "Tafuper": "KU-820" manufactured by Gisuke Konishi & Co., Ltd.
"Tafuper" to laminate aluminum; kraft liner paper to "Tafuper": "G 6000" manufactured by Gisuke Konoshi & Co., Ltd.
Laminate aluminum to kraft liner paper; kraft liner paper to kraft liner paper: "Pegarl 210P" manufactured by Koatsu Gas Kogyo Co., Ltd.

Figure 11A:
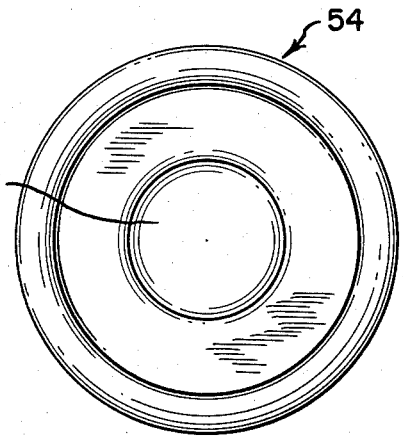
FIG. 11A is a top plan view of one form of an end-closure according to the present invention suitable for use in forming the container of FIG. 8.
Figure 11B:
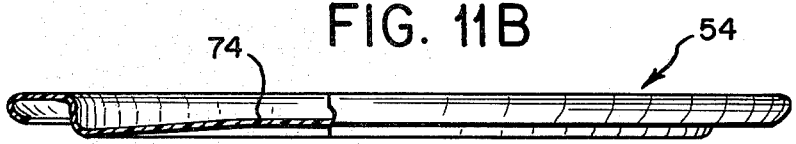
FIG. 11B is an enlarged orthographic projection of the end-closure depicted in FIG. 11A shown partially in section.
Figure 11C:
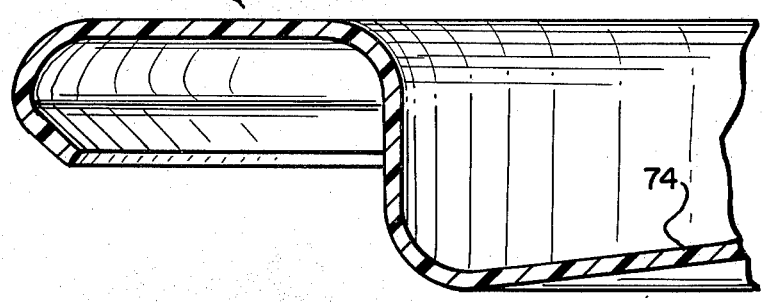
FIG. 11C is an enlarged cross-sectional view of a peripheral portion of the end-closure of FIG. 11A.

Referring to FIGS. 11A, 11B and 11C, end-closure 54 has a convexity or bulge portion 74 formed in the center. Bulge portion 74 is adapted to be inwardly deflected to reduce the volume of the container and thereby increase (i.e., relieve) the internal negative pressure which results, e.g., when the temperature of the sealed contents decreases. In this way, compressive stress generated on the cylindrical wall member of the container is reduced. For example, when bulge portion 74 is about 3.4 cm$^3$, the volume of the sealed container will be reduced by about 7 cm$^3$ through inward deflection. These parameters have been found to work very well for an end-closure 54 having an outside diameter of 52.0 mm and a bulge portion 74 having a diamter of 24 mm.

Referring now to FIGS. 12A and 12B, bottom end closure 56 is provided with a conventional so-called "pull-top" which is opened by outwardly pulling tab 76 to tear off a portion of the closure defined by line 78 so that the flowable contents of the container such as fruit juice can be poured or drunk from the resulting opening. A suitable pull-top end-closure is manufactured and sold by Hokkai Seikan. An accelerated stability test establishes that liquids such as fruit juice can be stored and preserved in the sealed container formed according to the present invention for at least seven months without deterioration. After use the container can readily be disposed of, since the polyolefin resin sheet material, typically "Tafuper" and the kraft liner paper will burn at about 700°–720° C. with liberation of 5000–7000 calories per gram without generating noxious gas and excessive smoke.

EXAMPLE 3

Figure 13:
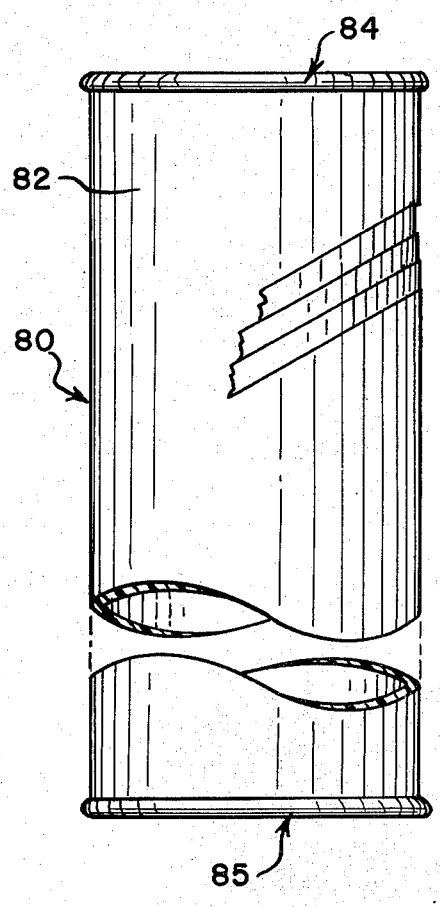
FIG. 13 is a side view, partially broken away, of a sealed cylindrical container according to a third embodiment of the invention.

Referring to FIG. 13, a sealed fruit juice container 80 is formed by applying top end-closure 84 and bottom end-closure 85 to the upper and lower edges respectively of cylindrical tubular container body 80.

Figure 14:
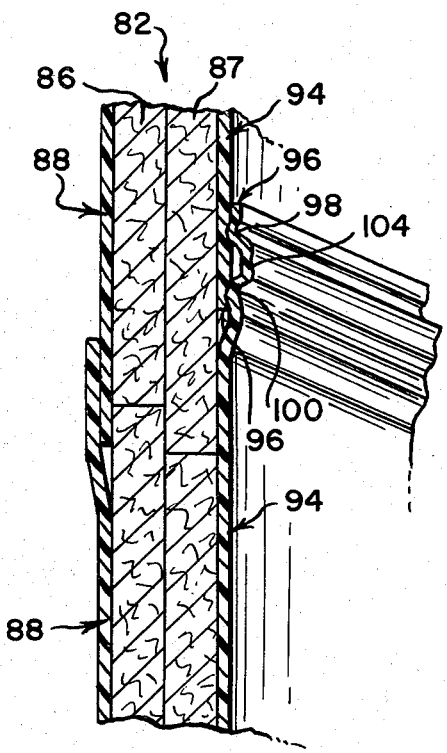
FIG. 14 is a longitudinal cross-sectional view of a portion of the cylindrical wall member of the container of FIG. 13.
Figure 15:
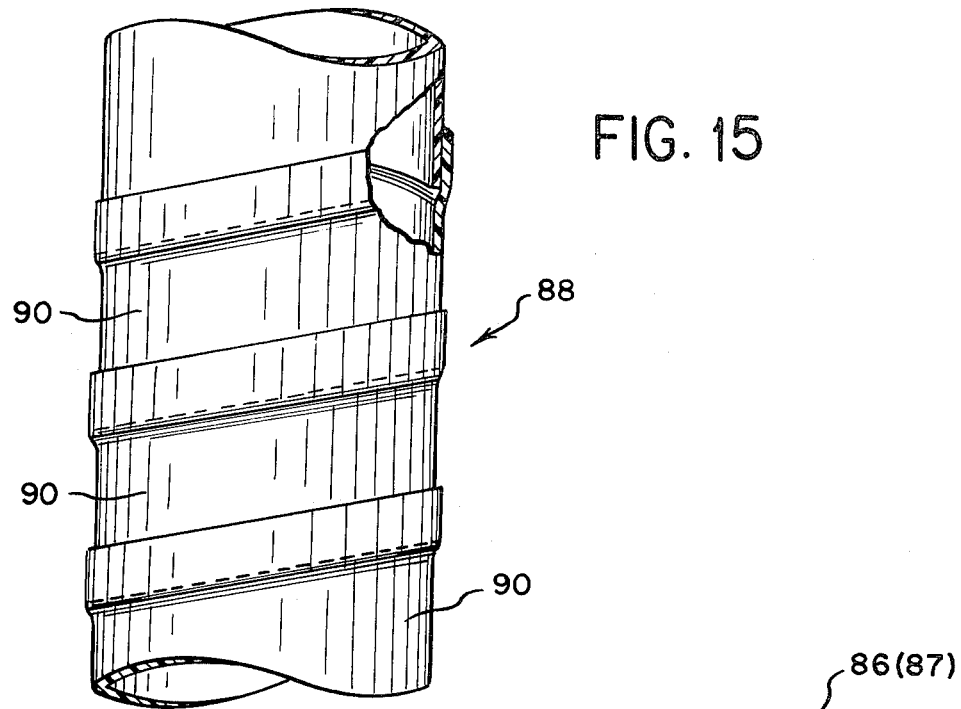
FIG. 15 is a side view, partially broken away, of the outermost layer of the cylindrical wall member of the container of FIG. 13.
Figure 16:
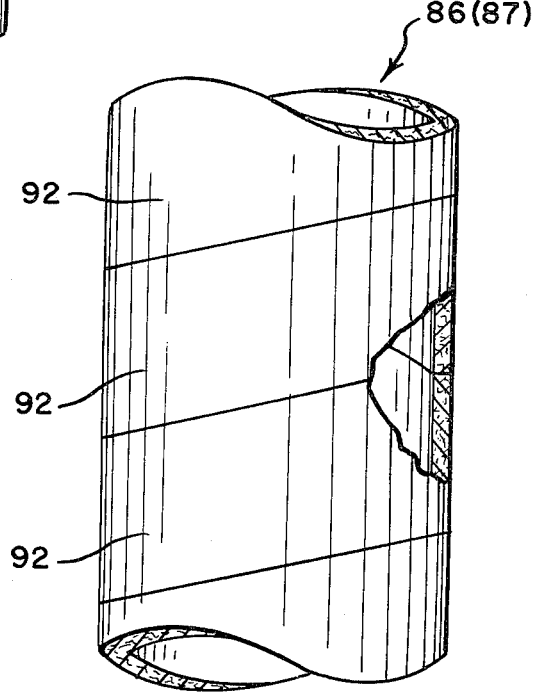
FIG. 16 is a side view, partially broken away, of the second layer of the cylindrical wall member of the container of FIG. 13.

As is apparent from the partial cross-sectional view in FIG. 14, cylindrical body 82 consists of four layers or plies. Outermost layer 88 is, as shown in FIG. 15, made by spirally winding an elongated sheet of water-proof paper, the upper and lower edges of each convolution 90 overlapping and being overlapped by the edges of the adjacent upper and lower convolutions, respectively, the overlapped edges being glued or otherwise bonded to each other to form a cylindrical layer. A suitable water-proof paper for use in forming outermost layer 88 is sold by Unichica Co. Ltd. under the name "UPO". Second layer 86 and third layer 87 are each made as shown in FIG. 16 by spirally winding an elongated sheet of kraft liner paper of relatively greater thickness than outer layer 88, the edges of each convolution being in abutment to each other to form a cylindrical layer. Innermost layer 94 is also made by spirally winding an elongated sheet of polymeric resin and overlapping the edges 96 of each convolution with those of the adjacent convolutions in a manner similar to outermost layer 88; here, however, the attachment of overlapped edges 96 is effected in the manner shown in FIG. 14; that is, along the overlapped edge portions, there are provided two continuous elongated welds or bonds 98 and 100 which are spaced apart from each other. Between the welds some slack 104 is left. These welds can be formed by heat-welding, supersonic welding, and the like and the above four layers or plies are bonded to each other in the manner described above. In a preferred embodiment, the bond between the polymeric resin sheet of innermost layer 94 and the kraft liner paper of third layer 87 is advantageously strengthened by the application of corona discharge to the polymeric resin sheet to form a roughness on the surface thereof prior to bonding.

Innermost layer 94 serves to prevent liquid material from permeating the container and to provide airtightness. For this purpose, "Fresckfilm" sold by Takigawa Chemical Kogyo Co., Ltd. is used as the material of innermost layer 94 and has been found to be particularly satisfactory. "Fresckfilm" consists of the following four layers: polyethylene (about 40 microns), polyester (about 12 microns), evaporated aluminum (less than several microns), nylon (about 15 microns) and polyethylene (about 40 microns).

The kraft liner paper of the second and third layers 86 and 87 provides mechanical strength to container body 80. In the embodiment illustrated in FIG. 14, the second and third layers are made of kraft liner paper "A 220 g, 0.3 mm" manufactured by Tohoku Paper Mills Co., Ltd. Insofar as achieving the necessary mechanical strength to resist internal pressure and resulting compressive forces in the axial direction is concerned, it is possible to use a single layer of kraft liner paper in place of the two layers illustrated in this example.

Conventional closure means, e.g., aluminum covers, can be used as the upper and lower end-closures 84 and 86 in conjunction with the container body member 82 of this embodiment; however, in large volume containers in which substantially greater negative pressures are developed, it is preferable to use at least one end-closure of the present invention described hereinabove as a closure means. The bottom, conventional end-closure is advantageously provided with opening means such as the so-called pull-top described hereinabove. Even if negative internal pressure develops after container 80 equipped with conventional end-closures is sealed, the slack 104 in innermost layer 94 is taken up inwardly in response to the negative pressure, thereby substantially lowering or relieving the negative pressure.

Incidentally, although in the present embodiment, the overlapped portion of the innermost layer is provided with two welds or bonds 98 and 100, three or more welds can be formed so as to form any desired number of slacks 104. Furthermore, both of the welds or bonds 98 and 100 are formed continuously along the overlapped portion of innermost layer 94; however since the airtightness of the layer is maintained by the first continuous weld, the second weld need not necessarily be formed continuously as long as some slack in the inner sheet is left between the first and second welds. Furthermore, although innermost layer 94 illustrated above is formed by spirally winding an elongated sheet, it is not limited as such; for example, it can be formed by making a wide width sheet into a circle to form a cylindrical layer. Furthermore, the tubular container bodies of this invention are not limited to those having a cylindrical (circular cross-section) configuration, but rather, can be formed, e.g., with a polygonal, elliptical or other non-circular cross-section.

EXAMPLE 4

Referring again to FIGS. 2 and 7 a further embodiment of the invention will be described in which container 12 is manufactured according to a method of the invention.

The container 12 can be manufactured by the steps of heating and charging a beverage such as fruit juice in container body 14 in the form of cylindrical container, to which a bottom end-closure 15 has been joined, and joined a top end-closure 10 formed of desired material such as tinplate to the upper end of the body member. The top end-closure 10 is formed into a dish shape as shown and is provided substantially centrally thereof with an outwardly bulged portion 42 before being joined to the container body.

After covering container body 14 with the top end-closure 10, flange 38 of the top end-closure and the upper end of the container body are overlapped and then folded to form a so-called "double-seam" 41 by means of a sealer or sealing apparatus (not shown) whereby the container is closed and sealed.

Next, the initially outwardly bulged portion 42 of the top end-closure 10 is urged by a press (not shown) toward the interior of the container body, thereby reversing the bulge and inwardly deflecting or "popping" it to form a concavity as shown in FIG. 2. This pressing step should be performed prior to lowering the temperature of the contents in the container otherwise the drop in temperature and consequent thermal contraction of air within the container will create an unrelieved negative pressure which tends to inwardly deform the wall of the container. Preferably, the top-end closure bulges outwardly to such an extent that reduction in volume of the container will be approximately equal to the volume of the thermal contraction of the container contents.

Industrial Applicability

As described above, the present invention provides a composite container for liquids which can function fully as a substitute for conventional containers made of glass, tinplate and the like. It also provides a closure member for hermetically sealing a container after it has been filled with a heated beverage and is characterized by a dish-shaped portion which is outwardly bulged before sealing and which undergoes inward deflection by the negative pressure created by thermal contraction in the container after sealing and upon cooling. In this way, the negative pressure in the container is substantially relieved so that the container can be made of inexpensive materials with lesser rigidity than would be otherwise necessary, such as plastics, cup paper and the like, instead of the tinplate now widely used. It is a feature of the invention that, even if the container is formed of cup paper or the like, it is possible to store it at room temperature for extended periods since differences in pressure between the exterior and interior of the can will not prejudice airtightness and imperviousness to microorganisms. A further advantage is that the container can be made of materials which can be readily disposed of e.g., by burning.

I claim:

1. A tubular wall member of a tubular container for flowable materials including liquids such as fruit juice and the like, having a bonded multilayer tubular element comprising a plurality of plies, the innermost ply being formed of a helically wound elongated polymer-containing sheet material having overlapping spiral convolutions, the overlapping portion of said spiral convolutions being provided with a continuous first bond therealong and a second bond adjacent said first bond and defining together with said first bond a slack portion between the first and second bonds extending along the inner overlapping portion of the spiral convolutions of the innermost ply, said slack portion being adapted to be taken up inwardly in response to negative pressure in the container.

2. A tubular wall member according to claim 1 wherein the second bond extends continuously and substantially parallel to the first continuous bond.

3. A tubular wall member according to claim 2 wherein one or more additional bonds is formed along the overlapped portion of the convolutions of the innermost ply and extends continuously and substantially parallel to the first and second bonds and defines an additional slack portion along said overlapped portion adapted to be taken up inwardly in response to negative pressure in the container.

4. A tubular wall member according to claim 3 wherein the tubular element comprises three plies, the second ply from the innermost ply being formed of a helically wound elongated cellulosic sheet material thicker than each of the first and third plies, the edges of adjacent convolutions of said second ply being in abutment to form a tubular layer, and the third outermost ply being formed of a helically wound elongated cellulosic sheet material having overlapping convolutions, the overlapped portion of said convolutions being bonded to each other to form a tubular layer.

5. A tubular wall member according to claim 4 wherein:
   the tubular element is a cylinder having a circular cross-section;
   the polymeric sheet material of the first ply is composed of a polyolefin;
   the cellulosic sheet material of the second and third plies is kraft liner paper; and
   the plies constituting the tubular element are bonded by adhesive and the overlapped portions of the convolutions of the first and third plies are bonded by adhesive.

6. A tubular wall member according to claim 5 wherein the second ply is formed of a plurality of kraft liner paper sheets.

7. A tubular wall member according to claim 6 wherein the first ply has a thickness of between about 0.08 and about 0.12 mm, and the second ply has a thickness of between about 0.2 and about 0.4 mm.

* * * * *